United States Patent

[11] 3,540,449

| [72] | Inventors | T. O. Paine<br>Deputy Administrator of the National Aeronautics and Space Administration with respect to an invention of<br>Samuel B. Wheeler, Monrovia, California |
|---|---|---|
| [21] | Appl. No. | 731,388 |
| [22] | Filed | May 23, 1968 |
| [45] | Patented | Nov. 17, 1970 |

[54] FLUID CONTAINERS AND RESEALABLE SEPTUM THEREFOR
12 Claims, 6 Drawing Figs.

[52] U.S. Cl. .................................................. 128/272, 128/275
[51] Int. Cl. ...................................................... A61j 1/00
[50] Field of Search ............................................ 128/272, 275, 294, 295, 251, 214, 227, 276; 150/1, 9; 229/62.5

[56] References Cited
UNITED STATES PATENTS

| 2,612,160 | 9/1952 | Barr ............................. | 128/214 |
| 2,936,757 | 5/1960 | Trace ........................... | 128/276 |
| 3,042,086 | 7/1962 | Winchell ...................... | 128/272X |

Primary Examiner—Warner H. Camp
Attorney—J. H. Warden, D. E. Leslie and G. T. Mc Coy ABSTRACT: Fluid containers and a resealable septum therefor are provided by fabricating the containers from preformed sheets made of polyester fiber material coated with a composition containing organosilicon polymers. The sheets are fused, or cemented together along their margins, with plastic inlet and outlet tubes in between. An outlet tube extends into each container a substantial distance and is provided with a plurality of perforations. A resealable septum is connected to the tubes of the containers for insertion or withdrawal of fluids with hypodermic syringes.

Patented Nov. 17, 1970

3,540,449

INVENTOR.
SAMUEL B. WHEELER
BY
ATTORNEYS

INVENTOR.
SAMUEL B. WHEELER
BY
ATTORNEYS

3,540,449

FLUID CONTAINERS AND RESEALABLE SEPTUM THEREFOR

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

This invention relates to improvements in the manufacture of fluid containers, and a resealable septum therefor for general use but especially useful for fluid in clinical and medical applications, and in biological research.

2. Description of the Prior Art

Fluid containers have had widespread use in clinical and medical applications as well as in biological research for such purposes as receiving body fluids necessary for diagnostic tests, dispensing fluids in medical treatment, and receiving, mixing, and dispensing fluids in biological research. In such applications, it is of utmost importance that access to the containers be readily made without jeopardizing the sterile condition of the containers and the passages into and out of the containers.

Containers made of flexible plastic sheets, such as sheets of plastic impregnated fabric, have been formed in the past by cementing, fusing, or otherwise coalescing the margins of the sheets. For ready access, one or more plastic tubes or sleeves are inserted between the sheets in the margin. After the containers and access tubes have been sterilized, the ends are suitably closed until ready for use. However, once used for receiving a body fluid, such as blood from a donor, the tube must be resealed. This has been done, for example, by pinching the tube and fusing the walls thereof. After a fluid has been dispensed from a container, the outlet tube need not be resealed unless it is to be used again without being resterilized, as may sometimes be the case, particularly in space flight biological research.

Ball check valves have been used to reseal tubes, but such valves are cumbersome, particularly when a container, or a system of containers, has a large number of tubes to be resealed after each use. Moreover, ball check valves depend upon pressure differentials which may present problems in some applications, particularly in research where environmental pressures may be varied above and below fluid pressure.

In the fields in which the present invention is especially useful, it is common practice to withdraw a fluid from a container with a syringe. If the container is flexible, the walls collapse as the fluid is withdrawn. This sometimes presents a problem in that the collapsing walls may pinch off the port of the outlet tube or isolate a portion of the fluid in an area of the container remote from the outlet port, yet it is more convenient to use flat containers made of flexible material because they are easy to handle and may be readily stacked to form a compact group. Moreover, if the container is flexible so that it may collapse due to a pressure differential as the fluid is withdrawn, the collapsing walls may be relied upon to drive the fluid toward the outlet port, particularly if the dimensions of the container are not proportionately large, thereby obviating the need for orienting the container with its outlet port at the bottom, as is necessary with inflexible containers. This is important in research where it is not always possible to so orient the container, or where the container may be subjected to acceleration at the time fluid is to be withdrawn such that forces other than gravity would act upon the fluid in the container.

Another problem with the prior art is that containers have usually been provided for particular applications only, and not for general use. Therefore, inlet and outlet systems for such special-use containers have been generally designed for the particular applications being contemplated. However, for research it is desirable to have available an inlet-outlet system of general use so that the researcher may quickly set up his program and modify it as necessary. Moreover, in research more so than in other applications, it is desirable to not only receive and dispense fluids from a container, but also to add a second fluid, such as a reagent, and then dispense the mixture or transfer the mixture to one or more other containers for further processing before analysis or other operation. Accordingly, the inlet-outlet system should be capable of being reused in a flexible manner, and for clinical and medical, or biological research, without jeopardizing the sterile condition of the system.

OBJECTS AND SUMMARY OF THE INVENTION

A primary object of the invention is to provide a fluid container for general use.

Another object is to provide an inlet-outlet system for fluid containers of general use.

yet a further object is to provide a common septum for a plurality of inlet and outlet tubes with means for quickly locating a desired inlet or outlet tube.

These and other objects are achieved by a fluid container fabricated from a pair of traylike sections formed out of flexible material with inlet and outlet tubes sealed between the margins of the sections. One of the tubes extends well into the cavity of the container and is provided with perforations in that portion so extending into the cavity. Holes in the margins may be employed to hold a plurality of containers in a stack. A common septum is provided for the inlet and outlet tubes of containers in a stack. It consists of a body having a plurality of bores passing from a face thereof to another side thereof, and having a groove cut in a plane substantially parallel to the face a depth sufficient to fully expose said bores. Resilient, self-sealing material in the groove seals the bores and protrudes from the groove to allow a cap placed over the face of the body to seal against it. Means is provided for coupling tubes from the containers to different ones of said bores on the other side of the body. To aid in locating a desired one of the bores, each bore is countersunk on the face of the body to a different depth.

The novel features of the invention are set forth with particularity in the appended claims. The invention will best be understood from the following description when read with the accompanying drawings.

DESCRIPTION OF THE PREFERRED EMBODIMENTS

Figure 1:
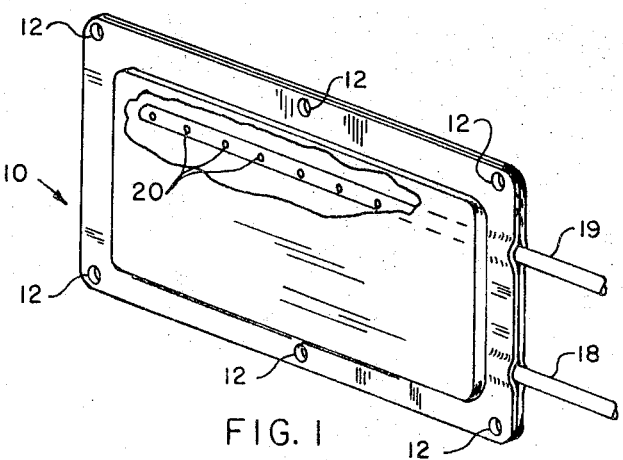
FIG. 1 is a perspective view, partially broken away, of a fluid container.
Figure 2:
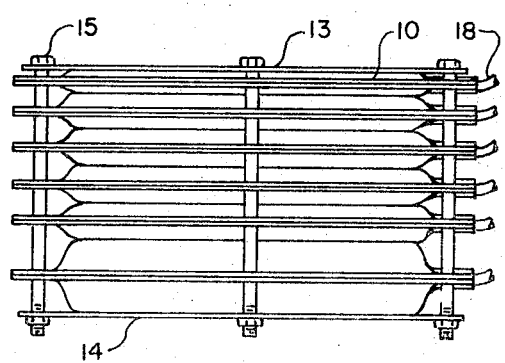
FIG. 2 is an elevation of a plurality of containers held in a compact stack between two plates.

Referring now to FIG. 1, there is shown a fluid container 10 fabricated from two preformed sheets of flexible material sealed (cemented, fused or otherwise coalesced) along the margins thereof. Holes 12 in the margin are provided in order that the containers may be stacked and, if desired, be held in a compact stack, as shown in FIG. 2, between two plates 13 and 14 with nut and bolt assemblies, such as a nut and bolt assembly 15. The flexible material may be either of two types: a completely impermeable substance which permits no fluid or gas to pass through the surfaces, or a semipermeable membraneous substance which while impervious to fluids may be osmotically responsive to gases so as to breathe to replace fluid withdrawn with an inert gas from the area outside the fluid wall.

Upon assembling the container 10 (FIG. 1), tubes 18 and 19 are sealed between the sheets on one side thereof to provide access to the container for inserting and withdrawing fluid. The inlet tube 18 extends only through the margin such that it barely emerges from the inside wall of the container, whereas the outlet tube 19 extends into the cavity of the container a substantial distance, preferably almost to the wall on the opposite side.

Perforations 20 are provided through that part of the tube 19 extending into the cavity of the container 10 in order that, as fluid is withdrawn and the flexible walls of the container collapse, if made of flexible material of the first type, complete withdrawal of the fluid is more certain than if the perforations 20 were not provided. Otherwise, the end port of the tube 19 could be pinched off by the collapsing walls of the container 10 or some fluid in the container might be trapped in some portion of the container by the collapsing walls.

A further advantage of the perforations 20 in the outlet tube 19 is that if two liquids have been placed in the container for mixing, withdrawal of the liquids through perforations along the entire length of the container will greatly assist in assuring that the liquids are completely mixed. This advantage is present even if the container is made of flexible material of the second type such that a pressure differential is not created as fluid is withdrawn to cause the walls to collapse. The friction presented by the inner wall of the tube 19 to the liquid being withdrawn will then complete the desired mixing. That is so because liquid passing through the center of the tube 19 will move at a faster rate than liquid flowing along the walls thereof.

Since the walls of the container 10 will tend to collapse at the center first owing to the traylike shape into which they are formed (if made of flexible material of the first type), the position of the tube 19 along one side of the container further assures that the perforations and end port of the tube 19 will remain open until substantially all of the fluid has been withdrawn. If the material is sufficiently flexible, and the container is used in an environment of substantial positive pressure (such as atmospheric pressure), even the edges and corners of the container will eventually collapse to further assure that substantially all of the fluid is withdrawn.

It should be noted that a negative pressure in the inlet as well as the outlet tubes will completely empty the container in any position. If the container is used in the position shown in FIG. 1, gravity will force a liquid away from the outlet tube 19. However, positive environmental pressure will in the usual case be sufficient to overcome the force of gravity as the walls collapse progressively more starting at the center until liquid at the bottom is forced up along the vertical sides of the container to the top. There a channel will remain to the last between the tube 19 and the upper edge of the container owing to the proximity of the tube 19 to the upper end wall of the container. For even better evacuation of liquid from the container, the tube 19 may be extended downwardly along the far wall (at the left as shown) and then back along the bottom wall and, if desired, upwardly near the entry wall, but that has not been found necessary with containers of moderate size (less than 6 inches by 9 inches). If tube 18 is used as the outlet, the walls will retain an open channel for withdrawal of liquid, and the entry wall will retain an open channel until the last owing to the support provided by the tubes 18 and 19.

Although for many applications the flexible containers of the present invention may be made of any material capable of being formed into a traylike shape, for general use in medical and clinical applications, or biological research, the material should be selected from those which are inert. One example of suitable material is a fabric (sheet of polyester fiber) placed between sheets of unvulcanized dimethylpolysiloxanes.

The material is placed in a mold which is heated to a temperature of 258°F for a period of about 1 hour. One-half of the mold is then removed and the remaining half is returned to the oven with the molded material for curing at the same temperature for about 1 hour. The result is a traylike section having a physical characteristic comparable to rubber but containing organosilicon polymers. The second half of a container is molded in the same way of the same material. In each instance, the mold provides an indentation on the margin thereof for each of the tubes 18 and 19.

It has been observed that the material just described is slightly permeable to liquid so that some loss results over several days, and slightly more permeable to gas so that the liquid lost is readily replaced with gas. If a completely impermeable container is desired, the inside of the traylike sections may be lined with sheets of such impermeable material as saran (vinyl), polyester or a flourcarbon resin.

Figure 3:
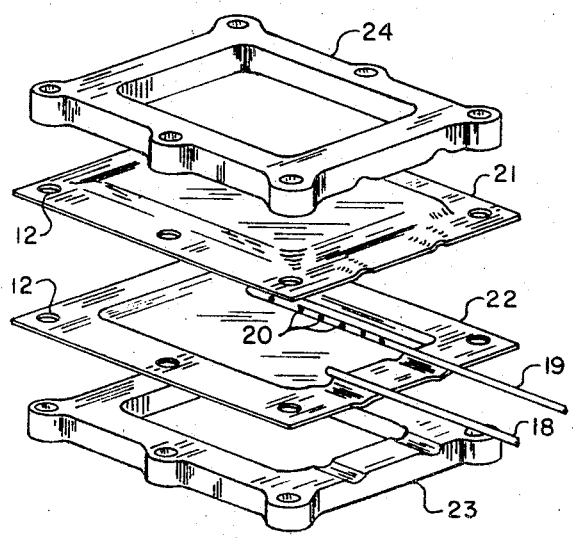
FIG. 3 is an exploded view of a jig employee to assemble the fluid container of FIG. 1.

FIG. 3 illustrates in an exploded view two sides 21 and 22 of a container molded in the manner just described and ready to be assembled by cementing, fusing or otherwise coalescing the margins. A jig consisting of two frames 23 and 24 is provided for that purpose. When all parts shown in FIG. 3 have been properly assembled, the jig is bolted together through holes therein coaxial with holes 12 molded into the margins of the two sides 21 and 22. As noted hereinbefore, those holes may be used to advantage in holding a stack of containers securely in place between two plates as shown in FIG. 2.

After the jig has been bolted with the two sides 21 and 22 of the container and tubes 18 and 19 in place, the jig may be heated or otherwise treated to fuse or coalesce the margins of the two sides 21 and 22 together. To assure that the tubes 18 and 19 remain open, a platinum wire is inserted into each. Once the container is removed from the jig, the platinum wire is withdrawn.

It has been found that the seal formed between the two sides of the container made of dimethylpolysiloxane impregnated polyester fiber is somewhat readily attacked by some reagents. Accordingly, to provide containers for most general use, it is preferable to cement the two halves 21 and 22 together, and around the tubes 18 and 19, with silicon rubber of the type which vulcanizes at room temperature, in which case the jig shown in FIG. 3 is employed simply to apply pressure at the margins of the two sides 21 and 22 while the sealant is vulcanized at room temperature.

Figure 4:
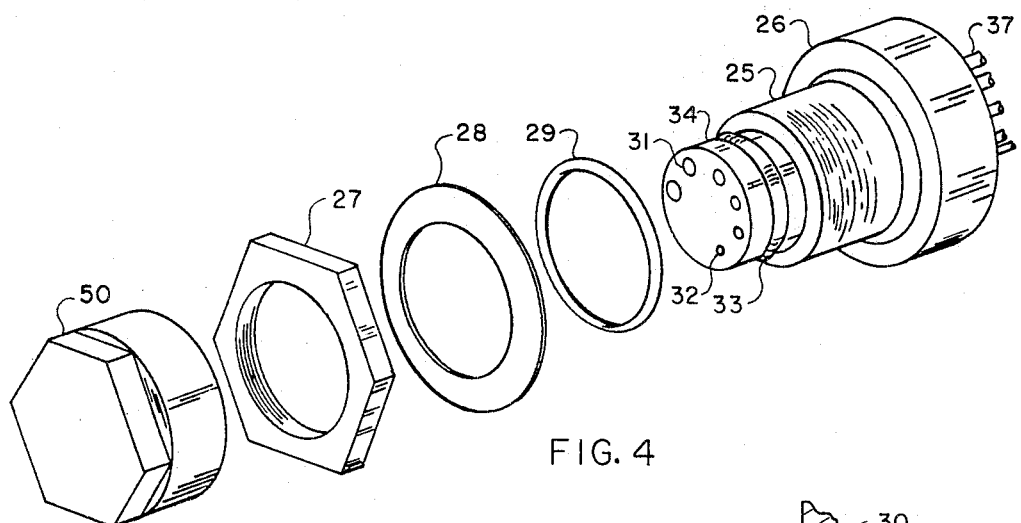
FIG. 4 is an exploded view of a resealable septum and cap therefor to be used with the stack of containers shown in FIG. 3.

Referring now to FIG. 4, there is shown a self-sealing septum assembly (in exploded view) for use with a plurality of containers, such as the stack of containers illustrated in FIG. 2. It consists of a threaded body 25 having a flange 26 such that when the threaded body is passed through a hole in a wall or frame, it may be secured in place by a nut 27. A washer 28 and an O-ring 29 are placed between the wall and the nut 27 and the flange 26, respectively, as shown in a longitudinal section of the assembled parts in FIG. 5. There the wall or frame is identified by the reference numeral 30.

Figure 5:
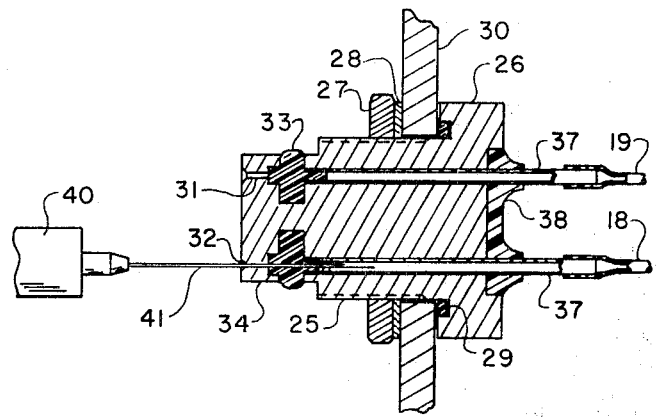
FIG. 5 illustrates an assembled resealable septum mounted on a frame, all of which is shown in a section taken on a plane passing through the longitudinal center line of the assembly.
Figure 6:
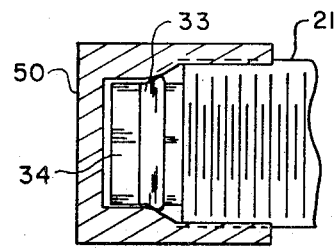
FIG. 6 is a partial detail of the resealable septum of FIG. 5 showing a cover (in section) in place.

The threaded body 25 is provided with a plurality of bores, such as bores 31 and 32 which extend from one end of the body 25 (the face thereof on the left as shown) through a circumferential groove to the other end thereof. An annular septum 33 made of resilient material capable of resealing itself when punctured, such as a silicone-type rubber, is placed in the groove as shown in FIG. 5. The outside diameter of the septum 33 is selected to be greater than an unthreaded section 34 of the body 25 so that it protrudes as shown in FIGS. 5 and 6.

Each of the bores is countersunk on the face of the body 25 to a different depth by a conical tool, preferably in progressive order as shown in FIG. 4, as an aid in identifying the different bores. As an alternative way of identifying the different bores, a concentric disk may be provided with one aperture. The disk may then be rotated to align its aperture with the bores in sequence starting from an index position. To locate a particular bore it would then be necessary to simply count the number of bores passed. A detent mechanism of the type consisting of a spring loaded ball carried by the body 25 may be employed to assist in aligning the aperture of the disk with the bores in the body 25. Such a detent mechanism well known to those skilled in the art could then be relied upon to locate a particular bore by simply counting detent positions from an index position. An advantage to be derived from such a detent mechanism is the ability to locate a given bore in the body 25 under adverse conditions, even total darkness. However, under more ideal conditions the simple means of identifying the different bores in the body 25 shown in FIG. 4 would be adequate.

Each of the bores in the body 25 is counterbored from the flange side through the circumferential groove thereof (i.e., past the septum 33). The diameter of the counterbores is sufficiently large to receive tubes, such as tubes 37, shown in FIG. 5. The septum 33 is preferably formed in place with unvulcanized silicon rubber, using a suitable mold during vulcanization. To prevent the material from running into the bores, such as bores 31 and 32, and back into the counterbores thereof toward the flange 26, platinum rods are inserted into the bores, and into the counterbores to the point beyond which such material is not desired. The rods are then removed after vulcanization.

The tubes 37 are preferably made of inert material such as glass, stainless steel, or platinum. For durability, stainless steel or platinum is preferred, particularly the latter because it is inert to most reagents used in the applications for which the septum is intended. Once the septum 33 has been molded in place, the tubes 37 are inserted into the counterbores of the body 25 with slight pressure against the septum 33. Epoxy sealant 38 is then placed around the tubes in an undercut portion in the flange end of the body 25. In that manner the tubes 37 are held securely against the silicone-type rubber of the septum 33. The flexible plastic inlet and outlet tubes are then stretched over the ends of the tubes 37, such as the plastic tubes 18 and 19 from the container 10 shown in FIG. 1. In that manner, a common septum is provided not only for the inlet and outlet tubes of one container but for inlet and outlet tubes of all containers in a stack, such as the stack of containers illustrated in FIG. 2.

To insert or withdraw fluid from a container, a hypodermic syringe 40 is employed as shown in FIG. 5. That is done by locating the appropriate bore (such as bore 32) in the body 25, inserting the needle 41 of the syringe into the bore 32 with sufficient force to puncture the neoprene septum 33 and allow the tip thereof to pass into the tube 37. The piston (not shown) of the syringe is then operated to insert or withdraw fluid. Once the operation of inserting or withdrawing fluid has been completed, the syringe is withdrawn. As the needle 41 is withdrawn from the septum 33, the puncture reseals itself due to the resilient nature of the material used. In that manner, the sterile condition of the container, tubing and septum is not violated or otherwise jeopardized. The fluid injected or withdrawn may, of course, contaminate the container and tubing. Accordingly, it may be necessary to rinse a container and its tubing before reuse in accordance with techniques established for the procedures being carried out.

It is common practice to cover a septum until it is about to be punctured by a hypodermic needle and then to recover it, particularly if it is going to be punctured again. That may be readily accomplished in the apparatus of the present invention by a cap 50 which, when placed over the face of the body 25 and screwed on as shown in FIG. 6, will form a tight seal against the septum 33 protruding from the body 25 owing to a reduced internal diameter of the cap 50 which is only slightly larger than the unthreaded section 34 of the body 25. Thus, each time the common septum illustrated in FIG. 5 is used to gain access to one of a plurality of containers connected thereto by flexible tubing, the cap 50 is replaced over the face of the body 25 to protect the sterile condition of the bores therein leading to the septum 33.

Although particular embodiments of the invention have been described and illustrated herein, it is recognized that modifications and variations may readily occur to those skilled in the art and consequently it is intended that the claims be interpreted to cover such modifications and equivalents.

I claim:
1. A fluid container comprising:
   a pair of traylike sections made of flexible material, the margins of such sections being sealed against each other to provide a sealed cavity;
   inlet and outlet tubes sealed between said margins, with one end of each tube being disposed within said cavity;
   a common septum connected to the tubes at the ends thereof disposed outside of said cavity and including a body having a plurality of bores passing from a face thereof to another face thereof, and a groove cut in a plane substantially parallel to said face to a depth sufficient to fully expose said bores;
   resilient, self-sealing material disposed in said groove to seal said exposed bores; and
   and means coupling each of said tubes to a different one of said bores at said other face.

2. A fluid container as defined by claim 1 wherein said resilient, self-sealing material protrudes outside said body, and wherein there is provided a cap shaped inside with a configuration substantially the same as, but only slightly larger than, the configuration of said body face and sufficiently deep to allow the cap to be placed over the face of said body and seated over said protruding resilient material to seal said face.

3. A fluid container as defined by claim 2 wherein said septum body has a sufficient number of bores to accommodate tubes of similar containers, whereby a common septum for a plurality of containers is provided.

4. A fluid container as defined by claim 3 wherein means is provided to aid in locating a desired one of said bores.

5. A fluid container as defined by claim 4 wherein said means comprises a countersink of a different depth on the face of said body for each of said bores.

6. A fluid container as defined by claim 1 wherein said body is a cylinder through which said bores pass in a straight line, and includes a first cylindrical section having a substantially smooth surface terminating adjacent to a second section remote from said face, and wherein said resilient, self sealing material radially protrudes outside said first section, and further comprises a cap having a cylindrical internal surface with a diameter slightly larger than the diameter of said first cylindrical section to allow the cap to be placed over the face of said body and seated over said protruding resilient material to seal said face.

7. A fluid container as defined by claim 6 wherein said second section is provided with external threads and has a diameter larger than the diameter of said first section, and wherein said cap is provided with an internally threaded section having an internal diameter slightly larger than the threaded section of said body to accommodate a coupling of the cap with said body.

8. A fluid container as defined by claim 1 wherein said septum body has a sufficient number of bores to accommodate tubes of similar containers, whereby a common septum for a plurality of containers is provided.

9. A septum for a plurality of containers comprising:
   a body having a plurality of bores passing from a face thereof to another side thereof, and a groove cut in a plane substantially parallel to said face to a depth sufficient to fully expose said bores;
   resilient, self-sealing material disposed in said groove to seal said exposed bores;
   said septum body having a sufficient number of bores to accommodate inlet and outlet tubes of said plurality of containers; and
   means for coupling each of said tubes to a different one of said bores on said other side.

10. A septum as defined by claim 9 wherein said resilient, self-sealing material protrudes outside said body, and wherein there is provided a cap shaped inside with a configuration substantially the same as, but only slightly larger than, the configuration of said body face and sufficiently deep to allow the cap to be placed over the face of said body and seated over said protruding resilient material to seal said face.

11. A septum as defined by claim 10 wherein means is provided to aid in locating a desired one of said bores.

12. A septum as defined by claim 11 wherein said means comprises a countersink of different depth on the face of said body for each of said bores.